(12) United States Patent
Kan et al.

(10) Patent No.: US 8,772,565 B1
(45) Date of Patent: Jul. 8, 2014

(54) METHOD OF RECYCLING RADIOACTIVE WASTE ACID

(71) Applicant: Institute of Nuclear Energy Research, Atomic Energy Council, Executive Yuan, R.O.C., Taoyuan County (TW)

(72) Inventors: Chin-Hsiang Kan, Hsinchu County (TW); Wen-Cheng Lee, Taoyuan County (TW); Tsong-Yang Wei, Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 134 days.

(21) Appl. No.: 13/934,503

(22) Filed: Jul. 3, 2013

(30) Foreign Application Priority Data

Apr. 26, 2013 (TW) .............................. 102115004 A

(51) Int. Cl.
*G21F 9/00* (2006.01)
*G21F 9/04* (2006.01)
*B01D 11/02* (2006.01)

(52) U.S. Cl.
CPC ................................. *B01D 11/0284* (2013.01)
USPC ................. 588/1; 588/18; 423/531; 423/544

(58) Field of Classification Search
USPC .................................. 588/1, 18; 423/531, 544
See application file for complete search history.

(56) References Cited

U.S. PATENT DOCUMENTS

| | | | | |
|---|---|---|---|---|
| 4,933,113 A | * | 6/1990 | Hanulik | 588/3 |
| 5,523,513 A | * | 6/1996 | Milner | 588/1 |
| 5,724,668 A | * | 3/1998 | Wood et al. | 588/1 |
| 6,203,769 B1 | * | 3/2001 | Zoppi | 423/37 |

* cited by examiner

*Primary Examiner* — Timothy Vanoy
(74) *Attorney, Agent, or Firm* — Jackson IPG PLLC

(57) ABSTRACT

A radioactive waste acid is recycled. The waste acid is a fluoboric waste acid. The waste acid contains a lot of oxides and radioactive nuclei. The waste fluoboric acid is processed to obtain a purified fluoboric acid. The amount of radioactive nuclei is greatly reduced. Thus, the present invention has a simple procedure with low cost and reduced power consumption.

9 Claims, 2 Drawing Sheets

METHOD OF RECYCLING RADIOACTIVE WASTE ACID

TECHNICAL FIELD OF THE INVENTION

Figure 1:
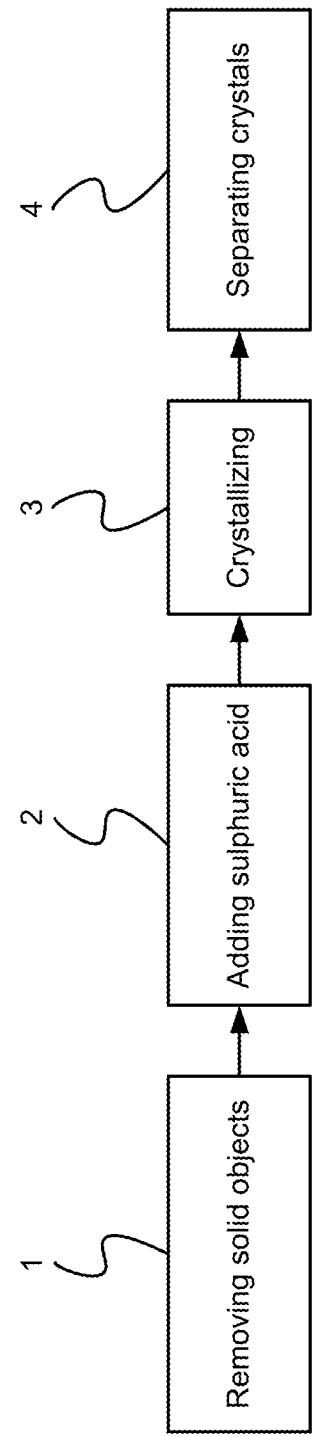

The present invention relates to recycling a radioactive waste acid; more particularly, relates to effectively reducing content of radioactive metal nuclei in a waste acid for recycling and reusing the processed waste acid, where the present invention has a simple procedure with low cost, low power consumption and reduced secondary waste.

DESCRIPTION OF THE RELATED ARTS

A light water reactor (LWR) are mostly made of carbon steel or stainless steel, like type 304, 304L, 316, 316L, 405, 430, 460, etc. Oxide membrane may be formed in the reactor for the devices and pipes of the reactor are made of metal or alloy materials and are contacted with the main cooling-water system of the reactor. Those devices and pipes are explored in a solution and are thus corroded. Different metal enters into the cooling water in forms of ions and fragments. These corroded metal materials enter into the core part of the reactor by following the cycling cooling water. After being radiated by neutrons, these materials are activated into radioactive nuclei to be formed into radioactive corroded materials. Yet, nickel (Ni) in the stainless steel may contain up to 0.2 percents (%) of cobalt (Co). Not only that Co has a high capture cross-section to hot neutrons (37 barn); but also that Co-60 is a product of radiation γ and β and may do harms to human health. For dealing with these radioactive corroded materials, different chemical agents can be selected to be used as dissolving agents (i.e. decontamination agents) for the membrane of radioactive corroded materials. Thus, the background radiation of the reactor can be reduced and the exposure dose of radiation to human can be lowered.

A waste acid is generated through the following steps. At first, the radioactive corroded materials are processed through oxidation, which have high solubility to fluoboric acid ($HBF_4$). After using $HBF_4$ as a decontamination agent, dissolved materials are accumulated in the solution as ions. Although $HBF_4$ has a high solubility (about 200 g/L of iron ions) to metals, metal salts will be deposited after ion density is saturated. Besides, free $HBF_4$ in the solution will be deducted until no decontamination is possible. Finally, the waste acid is generated.

A prior art relating to acid washing is revealed. At first, solid-liquid separation is processed to a waste acid containing lots of metal ions and oxides. Then, the liquid containing metal ions is sent to ion-exchange resin tube for absorbing the metal ions to recycle the waste acid. Yet, only a little amount of the waste acid is processed and a long time is taken, while a lot of waste ion-exchange resin and backwash liquor are produced. These by-products needs complex procedure followed for final treatment of stabilizing radioactive wastes.

Another prior art is revealed for recycling $HBF_4$ acid. At first, $Fe^{+3}$ in the acid is reduced to $Fe^{+2}$ and, then, a lot of oxalic acid is added. The oxalic acid is dissolved by increasing temperature to be stirred for reaction as follows:

$$Fe(BF_4)_2 + H_2C_2O_4 \longrightarrow FeC_2O_4 + 2HBF_4$$

At last, an $HBF_4$ solution is recycled through a filter. However, the filter is required and a secondary waste of ferrous oxalate thus generated has to be reprocessed through solidification or high-temperature incineration.

Hence, the prior arts do not fulfill all users' requests on actual use.

SUMMARY OF THE INVENTION

The main purpose of the present invention is to effectively reduce content of radioactive metal nuclei in a waste acid for recycling and reusing the processed waste acid, where the present invention has a simple procedure with low cost, low power consumption and reduced secondary waste.

To achieve the above purpose, the present invention is a method of recycling a radioactive waste acid, comprising steps of: (a) removing solid objects in a fluoroborate waste acid, where the solid objects are oxides and radioactive nuclei; (b) adding a sulphuric acid to the fluoroborate waste acid to be reacted for obtaining an acidic solution having metal sulphates; (c) crystallizing the acidic solution through convection with a cooling water for obtaining crystals of the metal sulphates containing crystallization water; and (d) processing solid-liquid separation to separate crystals of the metal sulphates from the acidic solution. Accordingly, a novel method of recycling a radioactive waste acid is obtained.

BRIEF DESCRIPTIONS OF THE DRAWINGS

Figure 2:
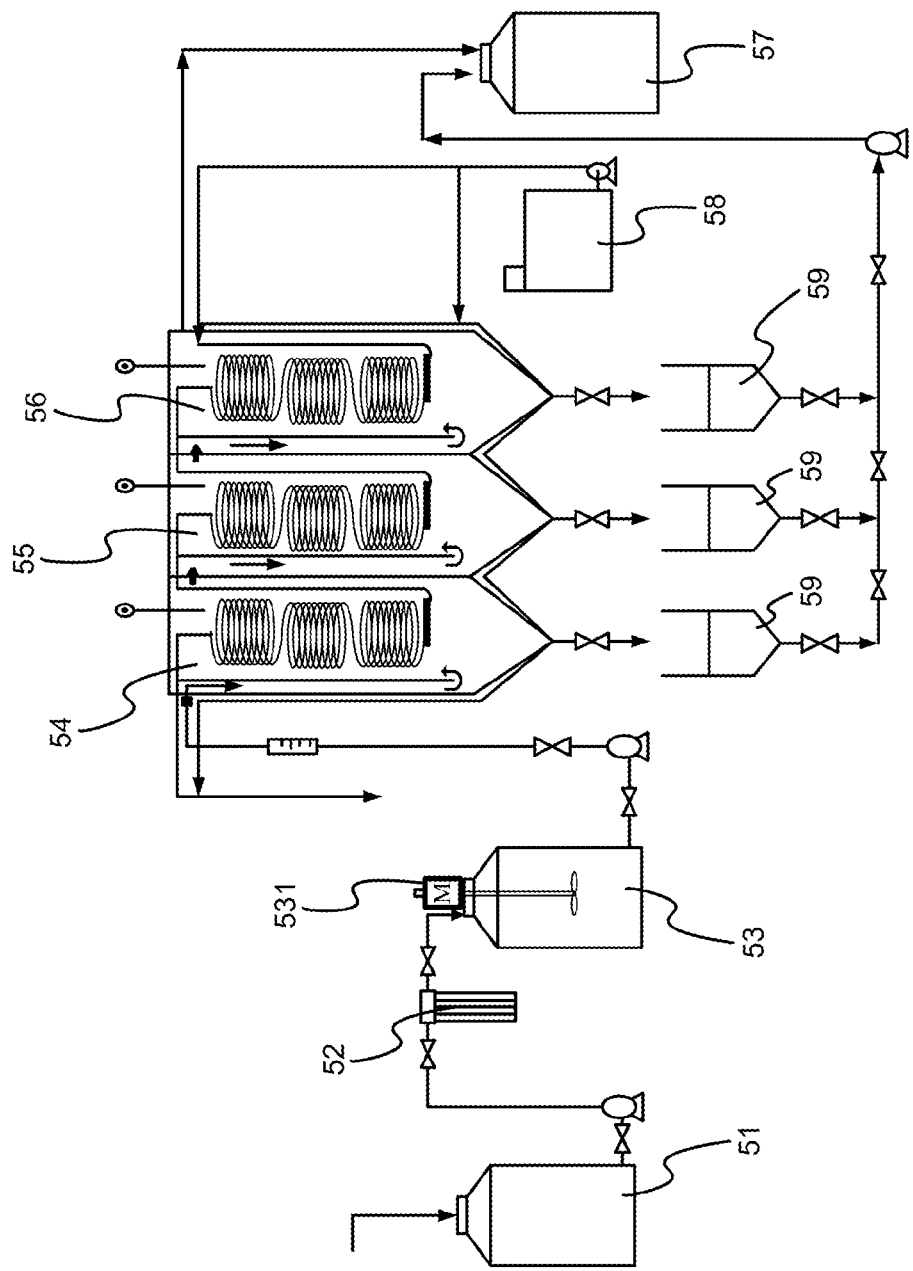

The present invention will be better understood from the following detailed description of the preferred embodiment according to the present invention, taken in conjunction with the accompanying drawings, in which FIG. 1 is the view showing the preferred embodiment according to the present invention; and FIG. 2 is the view showing the device of purifying and recycling a waste acid.

DESCRIPTION OF THE PREFERRED EMBODIMENT

The following description of the preferred embodiment is provided to understand the features and the structures of the present invention.

Please refer to FIG. 1 and FIG. 2, which are a view showing a preferred embodiment and a device of purifying and recycling a waste acid according to the present invention. As shown in the figures, the present invention is a method of recycling a radioactive waste acid, comprising the following steps:

(a) Removing solid objects 1: Solid objects in a fluoroborate waste acid, containing a lot of oxides and radioactive nuclei, are removed, where the fluoroborate waste acid has a density of 5~40 percents (%).

(b) Adding sulphuric acid 2: A sulphuric acid is slowly added to the fluoroborate waste acid for reaction to obtain an acidic solution having metal sulphates, including ferrous sulphate, cobalt sulphate, nickel sulfate, etc. Therein, the sulphuric acid has a density of 5~30 weight percents (wt %).

(c) Crystallizing 3: The acidic solution obtained after reaction is crystallized through convection with a cooling water to obtain crystals of the metal sulphates containing crystallization water. Therein, the crystallization is processed at a temperature of 2~8 Celsius degrees (° C.).

(d) Separating crystals 4: Solid-liquid separation is processed to separate crystals of the metal sulphates from the acidic solution for obtaining a purer fluoroborate acid.

Thus, a novel method of recycling a radioactive waste acid is obtained.

The above steps of removing solid objects 1, adding sulphuric acid 2, crystallizing 3 and separating crystals 4 are processed with a device of purifying and recycling a waste acid 5.

The device of purifying and recycling a waste acid 5 comprises a collecting tank 51 for containing the fluoroborate waste acid; a filter 52 connected with the collecting tank 514 for removing solid objects in the fluoroborate waste acid; a dispensing tank 53 connected with the filter 52 for containing a sulphuric acid and the fluoroborate waste acid obtained after the solid objects are removed; a pre-crystallizing tank 54 connected with the dispensing tank 53; a crystallizing tank 55 connected with the pre-crystallizing tank 54; a purifying tank 56 connected with the crystallizing tank 55; a recycling tank 57 connected with the purifying tank 56; a low-temperature recycling water tank 58 connected with the purifying tank 57; and a plurality of separating tanks 59 corresponding to the pre-crystallizing tank 54, the crystallizing tank 55 and the purifying tank 56. Therein, the dispensing tank 53 has an agitator 531 to stir the fluoroborate waste acid in the dispensing tank while the sulphuric acid is slowly added; after the fluoroborate waste acid reacted in the dispensing tank is flown into the pre-crystallizing tank and the crystallizing tank, the fluoroborate waste acid enters into the purifying tank and, in the end, flows back to the recycling tank; the pre-crystallizing tank 54 is cooled down to a temperature below 8 Celsius degrees (° C.) on being filled with the fluoroborate waste acid; the low-temperature recycling water tank 58 processes heat exchange through self circulation, where fluid flows through the purifying tank 56 and the crystallizing tank 55 to enter into the pre-crystallizing tank 54 and, then, flows back to the low-temperature recycling water tank 58; each of the separating tanks 59 processes solid-liquid separation to separate the crystals of metal sulphates from the fluoroborate waste acid through the following formula:

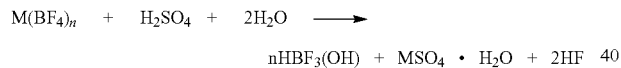

where the crystals of metal sulphates are $MSO_4 \cdot H2O$ ($M=Fe^{2+}, Co^{2+}, Ni^{2+}$).

Hence, the present invention has the following advantages:

1. Sulphuric acid is added for generating a lot of ferrous sulphate and improving purity of waste acid.

2. On processing the waste acid, feeding process is continuous and automatic with stirring for avoiding big crystals and blocks and enhancing recycling effect of the waste acid.

3. An automatic operation under a low temperature is provided with simple utilities, easy maintenance and low cost, while toxic gas and nuclear leakages are prevented for reducing harms to operators.

4. No extra chemical agents are required, so that cost and secondary waste are reduced.

5. Ferrous sulphate crystals containing crystallization water are generated, which can be used in fields of agriculture, environmental protection, ferric pigments, ferric catalysts, cement additives, forage additives, food additives, Mohr's salts, magnetic ferric oxides, etc. Besides, ferrous sulphate is a main element for producing blood-tonifying drugs. In the nuclear field, ferrous sulphate can be used as a reducer; and, under different temperatures, can be changed into a tetrahydrate or monohydrate used as a flocculating agent for waste liquid to effectively remove heavy metal ions for recycle.

To sum up, the present invention is a method of recycling a radioactive waste acid, where content of radioactive metal nuclei in a waste acid is effectively reduced for recycling and reusing the processed waste acid; and the present invention has a simple procedure with low cost, low power consumption and reduced secondary waste.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of recycling a radioactive waste acid, comprising steps of:
   (a) removing solid objects in a fluoroborate waste acid, wherein said solid objects are oxides and radioactive nuclei;
   (b) adding a sulphuric acid to said fluoroborate waste acid to be reacted to obtain an acidic solution having metal sulphates;
   (c) crystallizing said acidic solution through convection with a cooling water to obtain crystals of said metal sulphates containing crystallization water; and
   (d) processing solid-liquid separation to separate crystals of said metal sulphates from said acidic solution.

2. The method according to claim 1,
   wherein a device of purifying and recycling a waste acid is used and said device comprises
      a collecting tank, said collecting tank containing said fluoroborate waste acid;
      a filter, said filter being connected with said collecting tank, said filter removing solid objects in said fluoroborate waste acid;
      a dispensing tank, said dispensing tank being connected with said filter, said dispensing tank containing said sulphuric acid and said fluoroborate waste acid obtained after said solid objects in said fluoroborate waste acid are removed;
      a pre-crystallizing tank, said pre-crystallizing tank being connected with said dispensing tank;
      a crystallizing tank, said crystallizing tank being connected with said pre-crystallizing tank;
      a purifying tank, said purifying tank being connected with said crystallizing tank;
      a recycling tank, said recycling tank being connected with said purifying tank;
      a low-temperature recycling water tank, said low-temperature recycling water tank being connected with said purifying tank; and
      a plurality of separating tanks, said separating tank being separately corresponding to said pre-crystallizing tank, said crystallizing tank and said purifying tank.

3. The method according to claim 2,
   wherein, after being reacted in said dispensing tank, said fluoroborate waste acid enters into said pre-crystallizing tank and then said crystallizing tank and then said purifying tank and then said recycling tank; and
   wherein said pre-crystallizing tank is cooled down to a temperature below 8 Celsius degrees (° C.) on being filled with said fluoroborate waste acid.

4. The method according to claim 2,
   wherein said low-temperature recycling water tank processes heat exchange through self circulation; and wherein fluid flows through said purifying tank and said crystallizing tank to enter into said pre-crystallizing tank and, then, flows back to said low-temperature recycling water tank.

5. The method according to claim 2,
wherein said separating tank processes solid-liquid separation to separate crystals of metal sulphates from an acidic solution.

6. The method according to claim 2,
wherein said dispensing tank has an agitator to stir said fluoroborate waste acid on adding said sulphuric acid.

7. The method according to claim 1,
wherein said fluoroborate waste acid has a density of 5~40 percents (%).

8. The method according to claim 1,
wherein said sulphuric acid has a density of 5~30 weight percents (wt %).

9. The method according to claim 1,
wherein said acidic solution is crystallized at a temperature of 2~8 Celsius degrees (° C.).

* * * * *